Patented July 13, 1926.

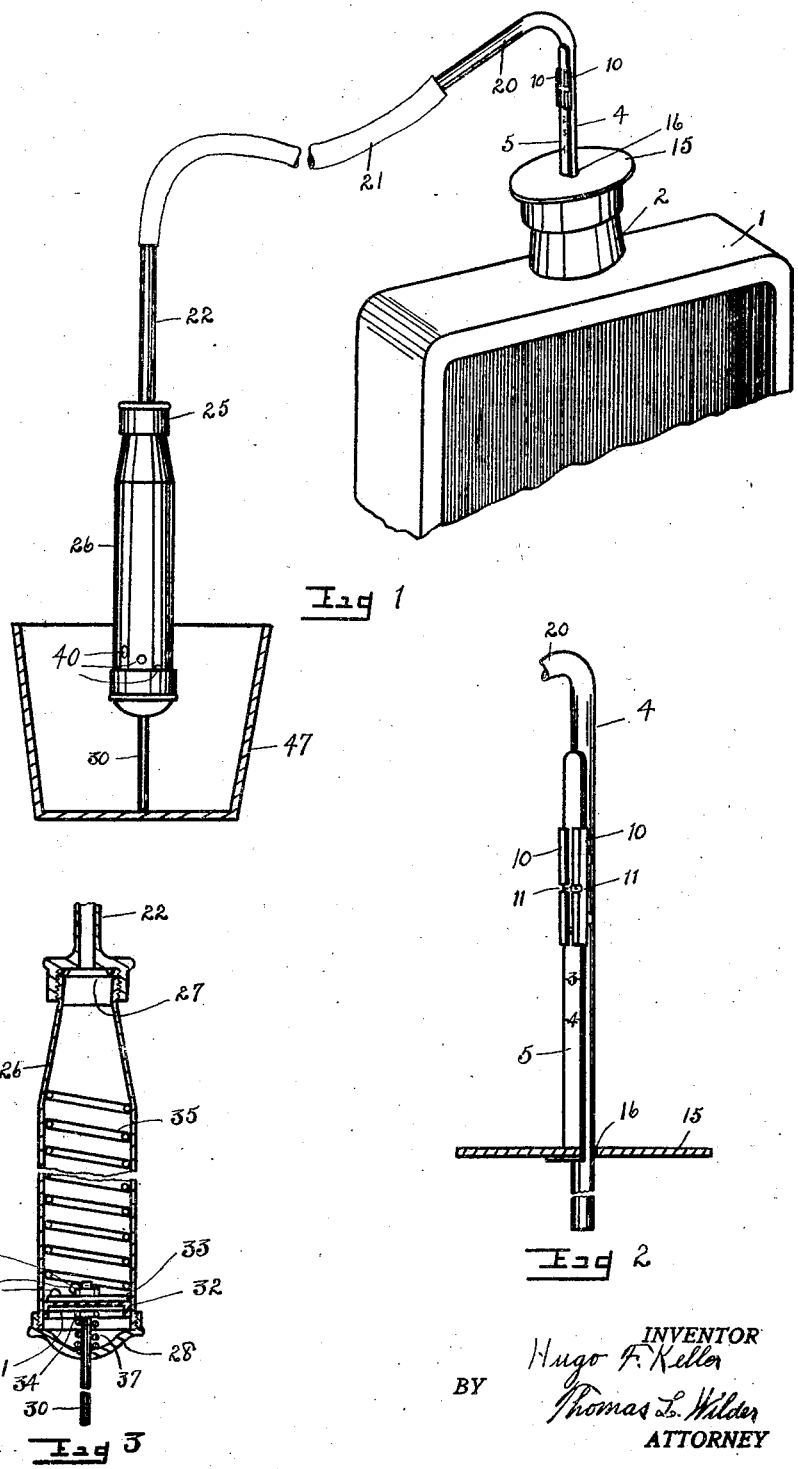

1,592,028

UNITED STATES PATENT OFFICE.

HUGO F. KELLER, OF ONEIDA, NEW YORK.

SIPHON FOR AUTOMOBILES.

Application filed August 19, 1924. Serial No. 733,027.

My invention relates to a siphon for automobiles, and I declare the following to be a full, clear, concise and exact description thereof, sufficient to enable anyone skilled in the art of which it appertains, to make and use the same, reference being had to the drawings in which like characters refer to like parts throughout the specifications.

The object of the invention is to provide a device that will draw a given amount of water from the radiator of an automobile, whereby a like amount of alcohol or other substitute for the water, used especially in cold weather, may replace the water thus withdrawn, with the assurance that the quantity of water withdrawn will equal the amount of alcohol to be replaced and none left over because an insufficient quantity of water had been withdrawn, as heretofore, or on the other hand the quantity of water withdrawn will not be greater than necessary, whereby to leave an insufficient quantity of water in the radiator.

The object will be understood by referring to the drawings in which: Fig. 1 is a perspective view of the device applied to the radiator of an automobile.

Fig. 2 is a detail enlarged view of a gage and immediate parts used; parts being broken away.

Fig. 3 is a detail enlarged central vertical section of a pump employed.

Referring more particularly to the drawings, the radiator of an automobile is shown at 1 having a filling neck 2, the cap not shown, being removed and the attachment applied with the tube 4 thereof projecting down into the radiator 1. Hollow tube 4 is adapted to be thrust down sufficiently far into radiator 1 so as to be in position to reach any ordinary quantity of water that it might be desired to remove.

A meter or gauge 5 having marks representing quarts and fractions thereof, graduated thereon is adapted to slide relative to hollow tube 4 in guide ways 10, 10 and be held at any given position. Guide ways 10, 10 are permanently attached by soldering or otherwise to the outer surface of tube 4. Furthermore, guide ways 10, 10 are split at 11, 11 to form an indicating line which has been predetermined for reading the graduated marks as they appear opposite on gauge 5. A disk 15, whose surface is disposed at right angles to the surface of gauge 5, whereby disk 15 will be in horizontal position when tube 4 is inserted in filling neck 2, is attached permanently to gauge 5 by soldering or in some other secure manner. An aperture 16 is formed in disk 15 which is large enough to permit said disk to slide with gauge 5 up and down on hollow tube 4.

The upper end of hollow tube 4 is bent at an angle, as at 20. The free end of bent part 20 is attached to a rubber hose 21. The other end of hose 21 is connected to the upper end of a hollow metallic tube 22 to which is attached or fixed thereto in a permanent manner a cap 25 that is screw threaded to the upper end of a hollow casing 26. A leather washer 27 being used to aid in making a tight joint. The lower end of casing 26 has screw mounted thereto, an enclosing member 28, provided with an aperture for the projection of rod 30. A piston valve 31 is mounted on the upper end of rod 30. A leather or rubber washer 32 is disposed above valve 31 and metallic washer 33 above washer 32. Nuts 34, 34 being screw mounted to the upper end of rod 30 to hold therebetween said valve 31, leather washer 32 and washer 33. A coiled spring 35 is disposed within hollow casing 26, whereby to hold valve 31 normally in the lower part of casing 26. Moreover, a coiled spring 37 is disposed about rod 30 to hold valve 31 slightly elevated off from closing member 28. Apertures 40, are made in the lower part of casing 26 for the escape of water passing through the tubes aforementioned to casing 26 from radiator 1. The lower end of rod 30 will rest ordinarily on the floor, ground or within and on the bottom part of a pail 47, if one is employed when using the device.

The operation of the siphon is effected when it is desired to withdraw a predetermined quantity of water from radiator 1 by first sliding gauge 5 along tube 4 to the correct reading of the quantity of water desired to be withdrawn or in the present instance, 1 quart. The cap, not shown, of the filling neck 2 will be removed and the device will be disposed then with tube 4 reaching down into radiator 1 and disk 15 resting on the upper edge of filling neck 2. The operator will place casing 26 below radiator 1 and grasp tube 22 and push downward thereon to force casing 26 down on piston valve 31. Immediately pressure is released on tube 22, casing 26 will fly upward under pressure of coiled spring 35, thereby causing a partial vacuum in hollow casing 26 sufficient to start the water in radiator 1 flowing towards casing 26 and thereout through apertures 40 into pail 37 or elsewhere on the ground. The water in radiator 1 will continue to siphon thereout until the level of the water in said radiator 1 has fallen below the level of the lower end of tube 4, which level is determined by the correct setting of gauge 5 relative to tube 4. Immediately the siphon has ceased to operate, thereby indicating that the given or predetermined quantity of water has been withdrawn from radiator 1 tube 4 will be removed and the alcohol poured into the filling neck 2, whereby to replace the water withdrawn, after which the cap, not shown, will be replaced on filling neck 2 to complete the operation.

Having thus described my invention what I claim is new and declare to secure by Letters Patent is:—

1. In a siphon for automobiles having a radiator, a tube adapted to be removably mounted on said radiator to draw water therefrom, a pump having apertures attached to said tube, a gauge slidably mounted relative to said tube for predetermining the amount of water to be withdrawn, a disk attached to said gauge, guide-ways attached to said tube for directing the movement of said gauge, and means for actuating said pump and for starting the siphon.

2. In a siphon for automobiles having a radiator, a tube adapted to be mounted on said radiator to draw water therefrom, a casing attached to said tube, a piston in said casing, whereby to create a suction, apertures formed in said casing, whereby to permit the discharge of water, a spring in said casing to hold said piston in normal position, a gauge slidably mounted relative to said tube for predetermining the amount of water to be withdrawn, a disk attached to said gauge, and a piston rod for actuating said piston and for starting the siphon.

In testimony whereof I have affixed my signature.

HUGO F. KELLER.